(12) United States Patent
Cong et al.

(10) Patent No.: US 10,033,912 B2
(45) Date of Patent: Jul. 24, 2018

(54) CASSETTE ATTACHMENT DEVICE FOR DETECTING INTENSITY OF TEST STRIP CASSETTE

(71) Applicant: EHOME HEALTH INC., Richmond, CA (US)

(72) Inventors: Ge Cong, Pleasanton, CA (US); Lijun Wu, Albany, CA (US)

(73) Assignee: HUNAN EHOME HEALTH TECHNOLOGY COMPANY LIMITED, Changsha (CN)

( * ) Notice: Subject to any disclaimer, the term of this patent is extended or adjusted under 35 U.S.C. 154(b) by 57 days.

(21) Appl. No.: 15/192,963

(22) Filed: Jun. 24, 2016

(65) Prior Publication Data

US 2016/0381265 A1 Dec. 29, 2016

Related U.S. Application Data

(60) Provisional application No. 62/184,139, filed on Jun. 24, 2015.

(51) Int. Cl.
| | |
|---|---|
| *G01N 21/55* | (2014.01) |
| *H04N 5/225* | (2006.01) |
| *H04W 4/00* | (2018.01) |
| *H04N 5/33* | (2006.01) |

(52) U.S. Cl.
CPC .......... *H04N 5/2256* (2013.01); *H04N 5/332* (2013.01); *H04W 4/008* (2013.01)

(58) Field of Classification Search
CPC ...... H04N 5/2256; H04N 5/332; H04W 4/008
USPC .................................................. 356/445–448
See application file for complete search history.

(56) References Cited

U.S. PATENT DOCUMENTS

| | | | | |
|---|---|---|---|---|
| 5,251,003 A | * | 10/1993 | Vigouroux | G01B 11/272 250/341.7 |
| 6,867,051 B1 | * | 3/2005 | Anderson | G01N 21/474 250/461.2 |
| 2012/0183442 A1 | * | 7/2012 | Kloepfer | G01N 21/78 422/82.05 |

* cited by examiner

*Primary Examiner* — Tri T Ton

(74) *Attorney, Agent, or Firm* — Perkins Coie LLP; Viola T. Kung

(57) ABSTRACT

Techniques for fast and accurate measuring test strip intensities are disclosed herein. A cassette attachment device for detecting intensity of a test strip cassette includes a strip chamber configured to accommodate at least a portion of a test strip, a light source configured to provide illumination to the test strip cassette via indirect lighting, an attaching mechanism configured to attach the device to a mobile device, and a camera window configured to transmit light signal reflected from the test strip cassette such that the mobile device can capture an image of the test strip cassette illuminated by the light source.

22 Claims, 7 Drawing Sheets

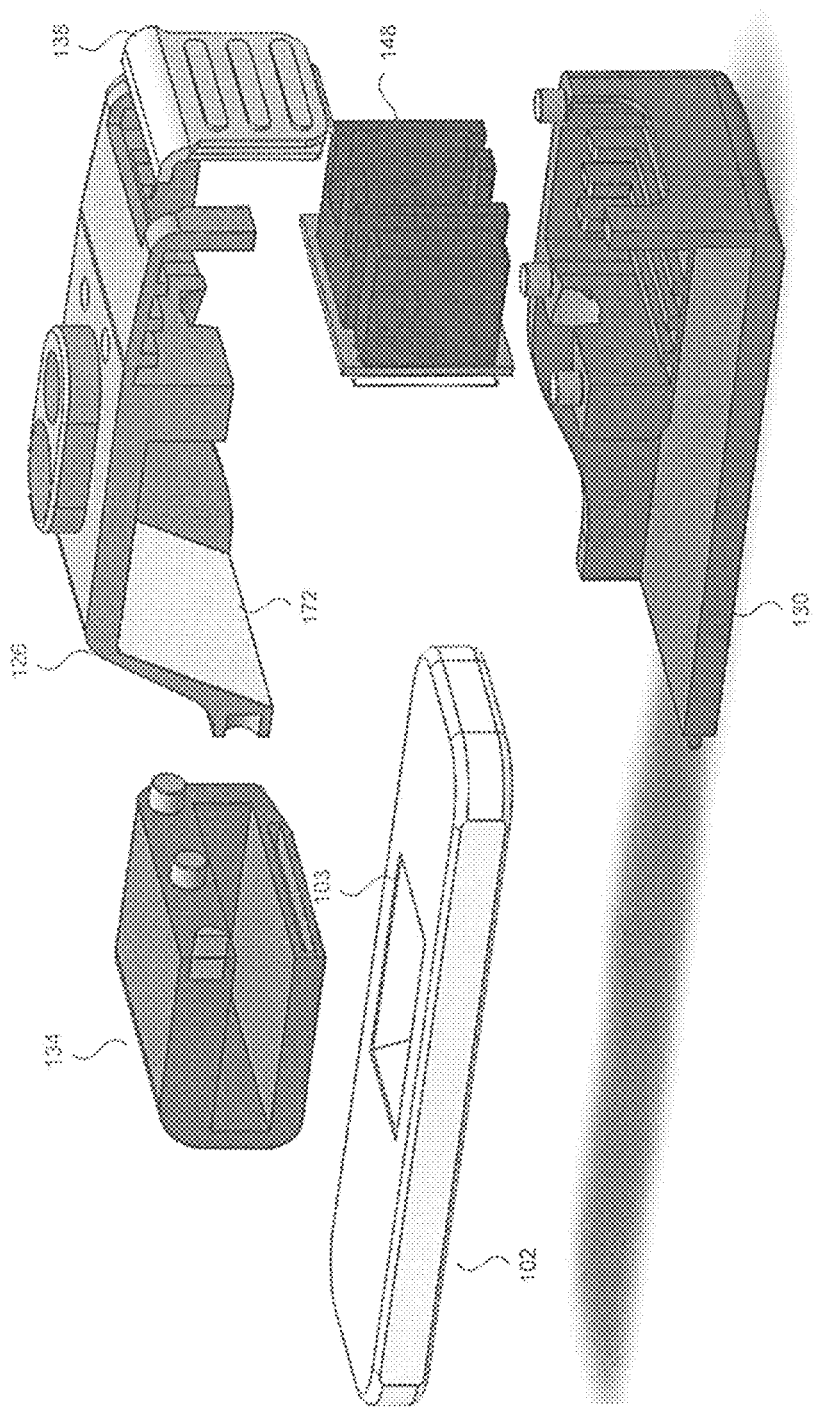

CASSETTE ATTACHMENT DEVICE FOR DETECTING INTENSITY OF TEST STRIP CASSETTE

CROSS REFERENCE TO RELATED APPLICATION

This application claims the benefit of U.S. Provisional Patent Application No. 62/184,139, entitled "CASSETTE ATTACHMENT DEVICE FOR DETECTING INTENSITY OF TEST STRIP CASSETTE", filed on Jun. 24, 2015, which is incorporated herein in its entirety by this reference thereto.

FIELD OF THE INVENTION

This invention generally relates to medical test strip systems, and in particular to a system for fast and accurate test strip intensity recognition.

BACKGROUND

Test strip cassettes, also known as flow immunochromatographic assays, are basic diagnostic instruments to detect the presence (or absence) of a target analyte in sample (matrix). They are commonly used for medical diagnostics either for home testing, point of care testing, or laboratory use. They can also be used for drug test, food test, water test, etc.

For some test strip cassettes, the color intensities of the bands have to exceed certain cutoff threshold values to indicate positive or negative test results. So it is important to accurately determine the intensity values for these test strips. There are dedicated machines for accurately reading the test strip results. These machines can control the testing lightning condition, are sensitive to test strip intensity changes, and have computational and reporting capabilities. But these machines are typically expensive and cumbersome to move, and requires professional training on how to operate the machines.

BRIEF DESCRIPTION OF THE DRAWINGS

FIGS. 1A and 1B illustrates a cassette attachment device for detecting intensity of test strips.

DETAILED DESCRIPTION

The present invention relates to cassette attachment device for accurately measuring band intensities of test strip cassettes. The cassette attachment device is designed to be attached to a computer device such as a mobile phone. The cassette attachment device secures the cassette at a known location, provides uniform illumination to the cassette, and transmits the optical signals to the mobile phone. The mobile phone collects the optical signals and analyzes the image of the cassette to determine the band intensities. Such a cassette attachment device is cheaper to manufacture, comparing to a standalone device for accommodating the cassette, capturing the image of the cassette and analyzing the image. The result is highly accurate because the cassette attachment device secures the cassette at a known location and provides uniform illumination to the cassette.

The test strip cassettes have one or more bands (or pads) impregnated with chemicals that react with the compounds present in the test fluid. For certain test strip cassettes such as test strip cassettes for detecting heart diseases, acquired immune deficiency syndrome (AIDS), or diabetes, the color intensities of the bands have to exceed certain cutoff threshold values to indicate positive test results. Therefore, it is important to accurately detect the intensities of the bands on these test strip cassettes in order to achieve reliable biological test results.

Figure 1A:
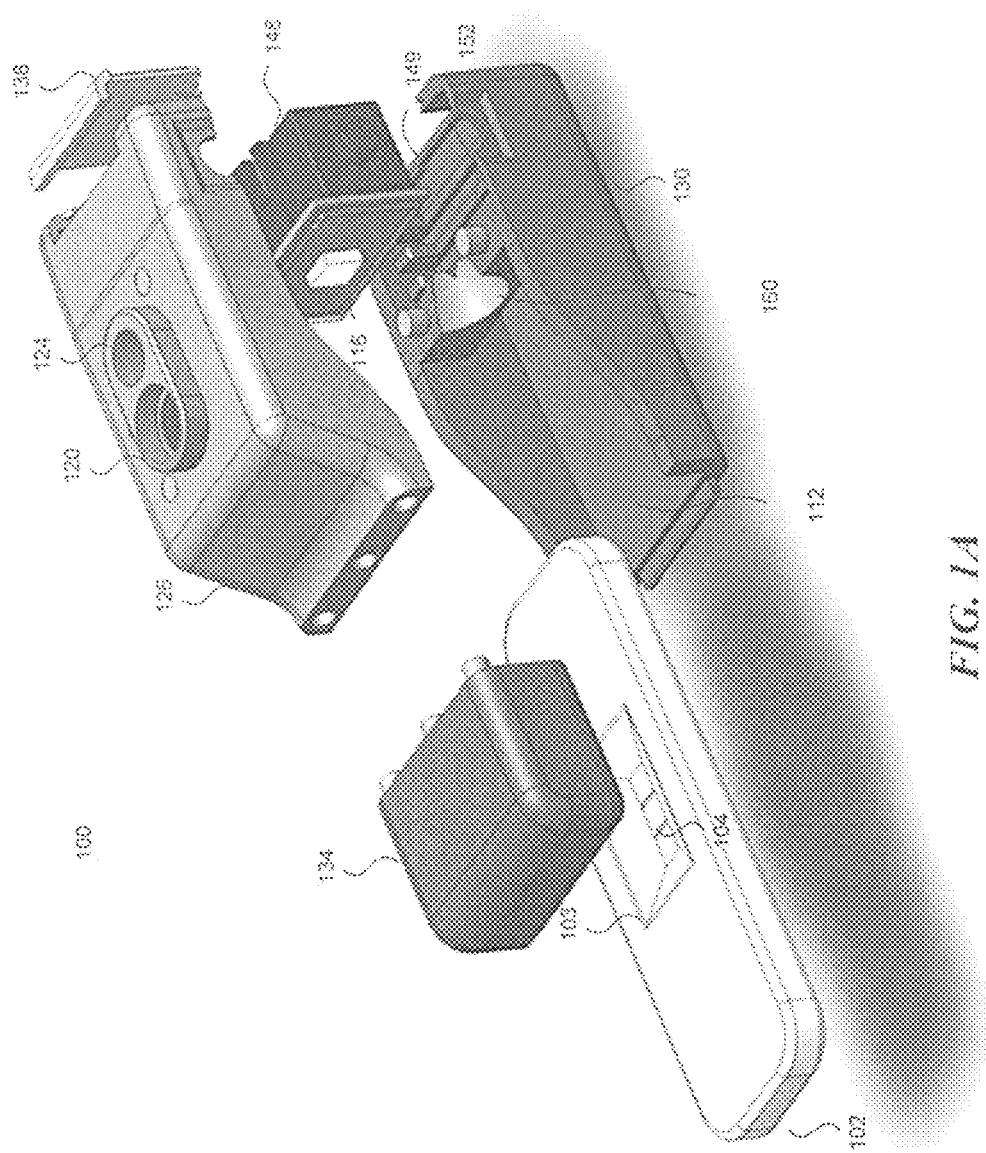

FIG. 1A illustrates a cassette attachment device 100 for detecting intensity of test strips, according to one embodiment of the present disclosure. As illustrated in FIG. 1A, the present disclosure provides a cassette attachment device 100 for accurately capturing images of the test strip cassettes and recognizing the intensities of the test strip bands. The cassette attachment device includes a strip chamber 112 to accommodate the test strip cassette 102. In some embodiments, a portion of the test strip cassette 102 can be inserted into the strip chamber 112 while the other portion of the test strip cassette could be outside the chamber. Once all components of the cassette attachment device 100 are closed, the cassette attachment device 100 forms a black box that encloses the whole test strip cassette 102 or the test string "inner" window 103. Thus, light outside of the cassette attachment device 100 cannot reach the reading surface of the test strip cassette 102 or "inner window" 103 and can not impact the intensity reading of the bands 104.

The cassette attachment device 100 includes a light source 116. The light source 116 can be, e.g., a light emitting diode (LED). Because no light outside of the cassette attachment device 100 can reach the test strip cassette 102 or "inner window" 103 when the device 100 is closed, the light source 116 is the only light source that provides light illumination to the test strip cassette 102 or the inner window. The control of the light source ensures that the test bands 104 is illuminated constantly for image capturing purpose.

The cassette attachment device 100 further includes a camera window 120. The shape of the camera window 120 is configured to fit a camera component of a mobile device. The mobile device can be a cellphone, a smart phone, a tablet, a digital camera, or any device capable of capturing an image of the test strip cassette 102.

Figure 2:
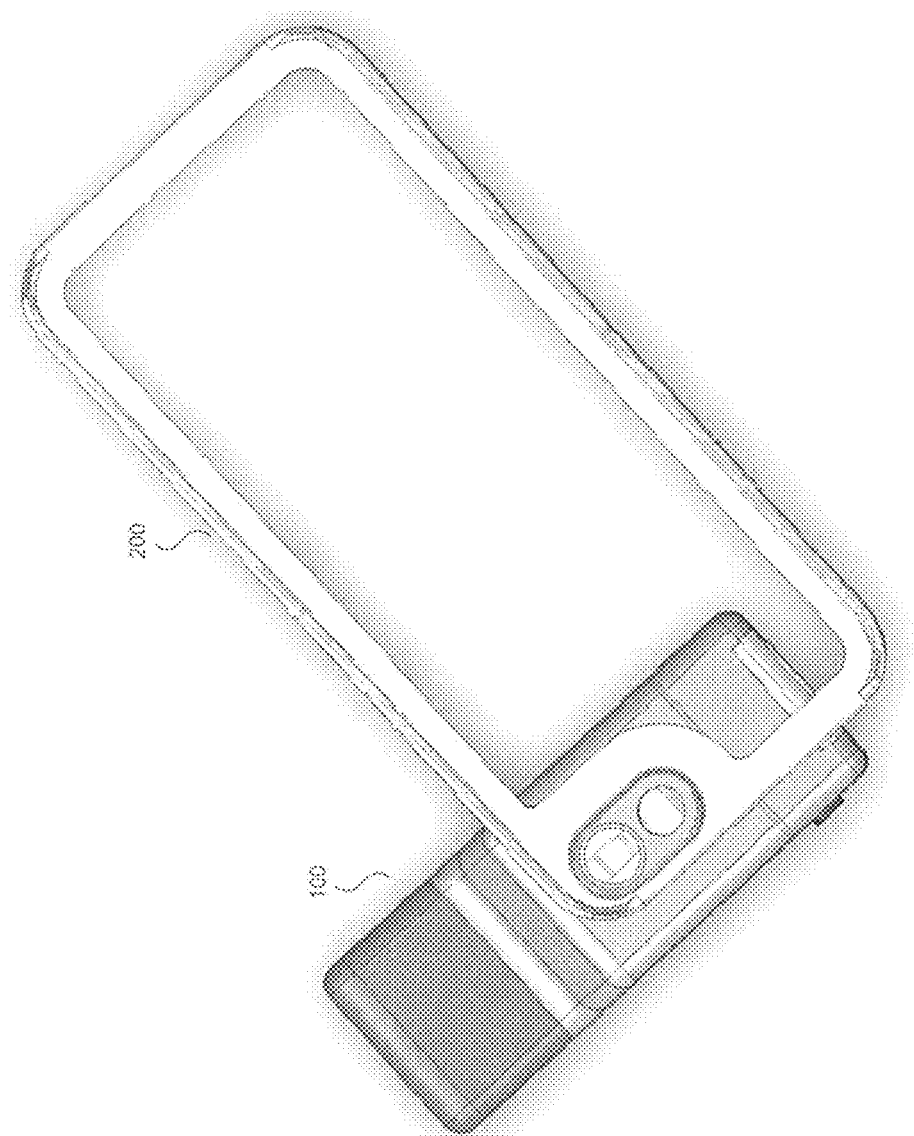
FIG. 2 illustrates a detachable mobile device case to which the cassette attachment device can mount.

FIG. 2 illustrates a detachable mobile device case 200, according to one embodiment of the present disclosure. The separate mobile device case 200 can be detachably secured to the mobile device. In one embodiment, the mobile device case is secured to the mobile device with magnetic components embedded. Thus, the cassette attachment device 100 can be properly attached to the mobile device case via the magnetic attraction force between the magnetic components embedded in the upper cap 126 and the mobile device case.

The camera window 120 of the cassette attachment device 100 can attach to a camera component of the mobile device (via the mobile device case 200 or by other means). Though the camera window 120, the camera component of the mobile device can guide the light reflected from the test strip cassette 102 or the inner window 103 onto its imaging sensor and therefore capture an image of the test strip cassette 102 or the "inner window" 103.

In some embodiments, the cassette attachment device 100 can include a flash window 124. The flash window 124 is positioned so that a flash component of the mobile device can flash light into the flash window 124, when the cassette attachment device 100 is properly attached to the mobile device. Thus, for embodiments that include the flash window 124, the flash component of the mobile device can be the light source providing light to the test strip cassette 102.

The mobile device can run a strip recognition application to capture the image of the test strip cassette 102 using the camera component of the mobile device. The strip recognition application may also adjust the intensity of the light source 116 or the flash component and the focus and exposure parameters of the camera component of the mobile device. Illumination intensities and camera parameters of mobile devices can be different depending the models and configurations of the mobile devices, the strip recognition application can correct them with pre-defined algorithms.

For embodiments that include the light source 116 inside of the cassette attachment device 100, the flash window 124 may not be necessary since the cassette attachment device 100 already has its own light source. Once the light source 116 turns on to provide light to the reading surface of the test strip cassette 102, the strip recognition application running on the mobile device can instruct the camera component of the mobile device to capture an image of the test strip. Since the light intensity of the light source 116 is constant and known to the strip recognition application, the images of the test strip cassettes are captured under the same lighting condition. In other words, the lighting condition for the test strip cassettes does not depend on model of the model device or ambient lighting condition.

The strip recognition application further analyzes the captured image and recognizes the intensity or intensities of the one or more bands 104 on the test strip cassette 102. The strip recognition application can then visualize the intensities by, e.g., presenting numerals on a display component of the mobile device, storing the numerical values of the intensities in a storage component of the mobile device, or sending out the numerical values of the intensities via a wired or wireless network.

For example, the strip recognition application can send the intensity values to a cloud server. The cloud server can then compare the intensity values with the calibration data (e.g., a calibration curve) stored in the cloud server. The cloud server then can determine a test value (e.g., concentration of certain matters in the test fluid) based on the one or more intensity values. The strip recognition application can retrieve the test value from the cloud server and present the test value on the display component, optionally accompanied with explanation or recommendation.

Figure 3:
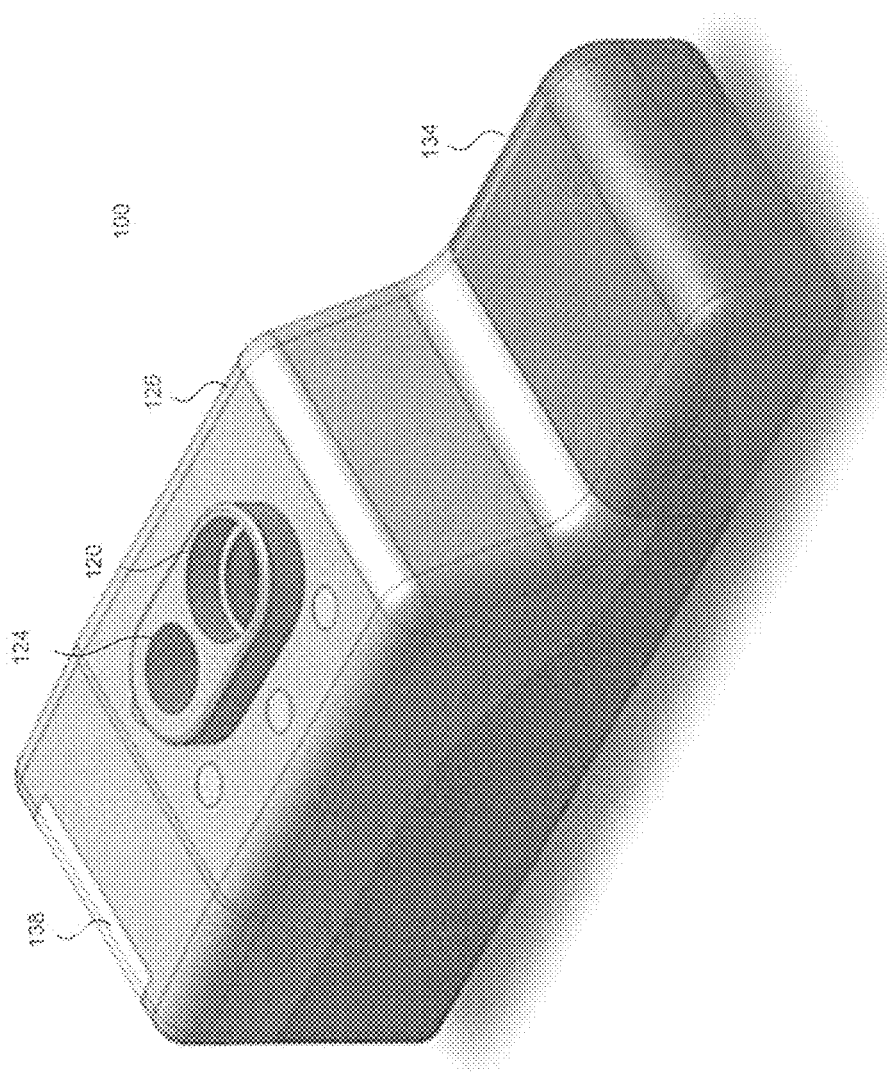
FIGS. 3 and 4 illustrate the cassette attachment device when the caps are closed.
Figure 4:
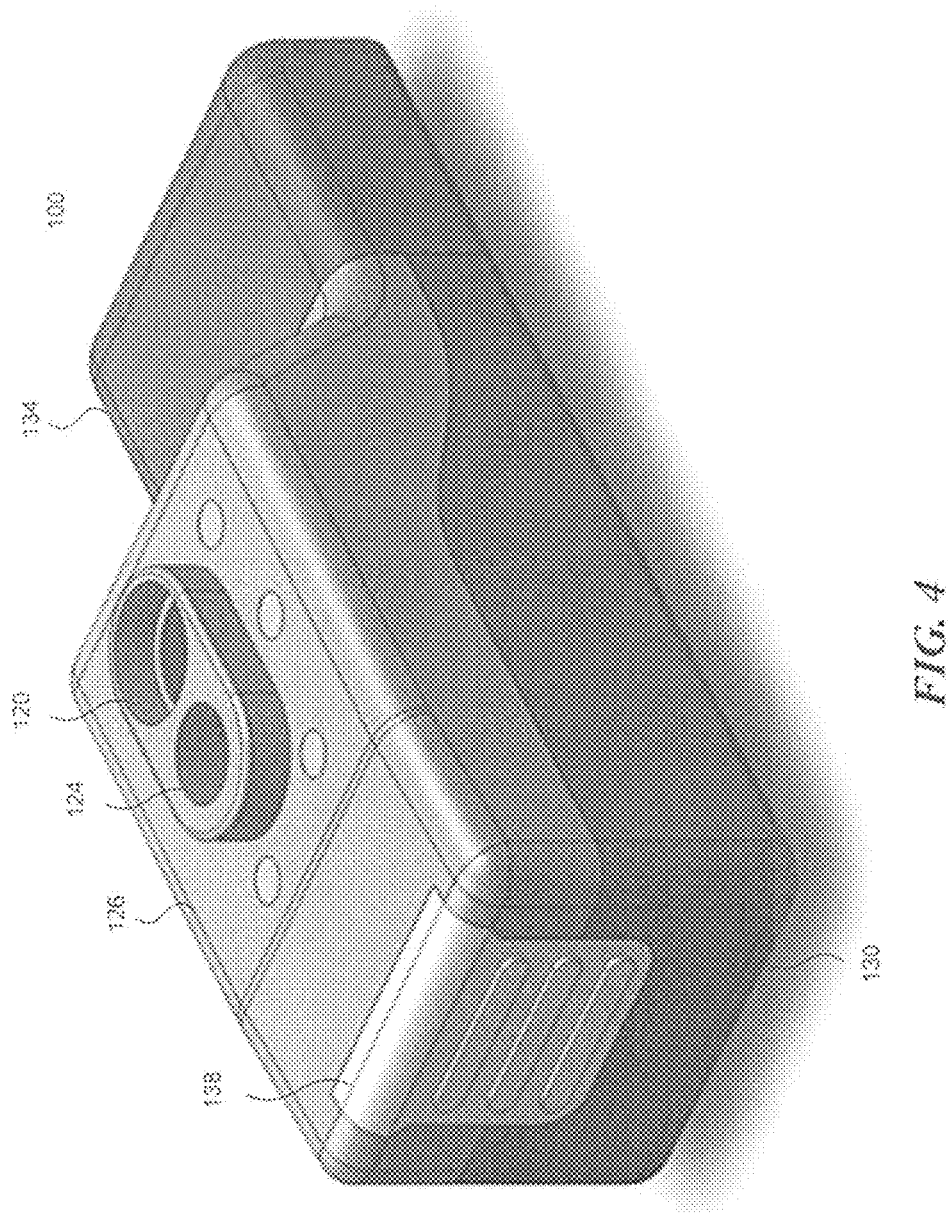

The outside case of the cassette attachment device 100 can include multiple separate pieces that can be attached together. For example, the cassette attachment device 100 illustrated in FIG. 1A includes upper cap 126, lower cap 130, front cap 134 and back cap 138. The caps 126, 130, 134 and 138 can be attached together by mechanical means (e.g., pins and holes). The caps 126, 130, 134 and 138 can further include magnetic components such that the caps 126, 130, 134 and 138 attach to each other via magnetic forces. FIGS. 3 and 4 illustrate the cassette attachment device 100 when the caps 126, 130, 134 and 138 are closed.

The cassette attachment device 100 includes a control circuit 140 and a battery 150 (not shown in FIG. 1A). The control circuit 140 includes a control chip 144 (not shown in the figures) electrically connected to the light source 116. The control chip 144 ensures that the light source 116 emit a light having a constant and predetermined intensity. In other words, the control chip 144 ensures the emitted light remains the constant lumen intensity regardless of the condition or energy level of the battery 150 and outside conditions. For example, the control chip 144 can ensure the constant lumen intensity by supplying constant and predetermined electrical current and voltage to the light source 116, in some embodiments.

The control circuit 140 and the battery 150 can be enclosed in an electrical box 148. The electrical box 148 is positioned and fixed in the cassette attachment device 100. For example, the electrical box 148 may have an edge 149 that fits into a groove 152 on the lower cap 130, as illustrated in FIG. 1A.

The cassette attachment device 100 further includes a collimator 160 such as a parabolic reflector having reflecting surfaces coated with reflecting paper. FIG. 1A shows the bottom half of the parabolic reflector 160 on the lower cap 130, while the non-shown top half of the parabolic reflector 160 is on the upper cap 126. The collimator 160 is positioned in proximity to the light source 116 to ensure the light from the light source 116 disperses minimally as the light propagates and form parallel lights.

Furthermore, some or all surfaces of the cassette attachment device 100, e.g., the inner surfaces of the caps 126, 130, 134 and 138, can have reflective mirror(s) (e.g., reflective coatings) or diffusing paper to reflect the light back to the reading surface of the test strip cassette 102. For example, FIGS. 1A and 1B illustrate that the light source 116, the collimator 160 and reflective mirror(s) 172 form a light engine for providing indirect light that is uniformly transmitted onto the reading surface of the test strip cassette 102 and "inner window" 103.

To ensure a relatively uniform illumination of the reading surface of the test strip cassette 102, the light engine is designed such that the majority of light emitted by the light source 116 does not reach the test strip cassette 102 directly. Most of the light emitted by the light source 116 is reflected by the collimator 160 and the reflective mirror 172 (and in some embodiments other inner surface) of the cassette attachment device before the light reaches the test strip cassette 102. The design improves the illumination uniformity of the test strip cassette 102 and reduces the space needed between the light source 116 and the test strip cassette 102.

The light source 116 (e.g., an LED chip, especially a surface-mounted LED chip) has a dominant wavelength based on the physical property of the light source 116 (e.g., depending on the semiconductor bandgap of the LED chip). The cassette attachment device 100 can include various types of light source 116 with different dominant wavelengths to match the optical reflection or absorption nature of the band(s) on the test strip cassette 102. For example, the light source 116 can be an LED chip emitting visible light (e.g., blue light).

In one embodiment, the test strip cassette 102 contains florescence band (or bands), and the light source 116 can be an LED chip emitting ultraviolet (UV) light. The florescence band absorbs the UV light and emits light at visible region. The emitted light travels through the camera window 120 and is captured by the camera component of the mobile device. In some embodiments, using florescence sensitive band and UV illumination can increase the sensitivity to noise ratio and thus improve the reading accuracy.

In another embodiment, the test strip cassette 102 contains one or more bands that absorb infrared (IR) light provided by an IR LED chip and emit light at visible region. In some embodiments, the signal sensitivity of the IR test strip bands can be much higher than the sensitivity of the UV or visible test strip bands.

A optical filter can be installed in front of the camera to improved the signal to noise ratio by letting lights in certain wavelength range pass but other wavelength range blocked. This can also increase the sensitivity to noise ratio and thus improve the reading accuracy In some embodiments, the strip recognition application running on the mobile device does not retrieve any additional information from the cassette attachment device 100, other than the image of the test strip cassette 102 captured through the camera window 120. Since the light source 116, controlled by the control chip 144, provides a constant and predetermined illumination, the illumination condition of the test strip cassette 102 is known to the strip recognition application, prior to the capturing of the test strip cassette image. In some other embodiments, the cassette attachment device can include wireless or wired interface to communicate additional information to the mobile device. For example, the cassette attachment device can transmit a RFID (radio-frequency identification) signal to indicate the type of the test strip, a threshold intensity value for the test strip, or the illumination intensity value.

The camera window 120 can include a collimating lens 121 (not shown in the figures). The collimating lens 121 enables the camera component of the mobile device to take a clear picture of the test strip cassette 102, even that the distance between the test strip cassette 102 and the camera component is shorter than the designed minimum focus distance of the camera component. For example, an on-board camera of a mobile smart phone may have a minimum focus distance of about 3.5 inches. That means without helps of external components, the on-board camera cannot take a clear picture of anything closer than 3.5 inches, due to the optical limitation of the on-board camera. However, with the help of the collimating lens 121, the on-board camera is able to take a clear picture of the test strip cassette 102, even that the distance between the test strip cassette 102 and the on-board camera is less than 3.5 inches when the cassette attachment device 100 is properly inserted into the mobile device.

In some embodiments, the test strip cassette 102 may provide additional data to the strip recognition application. For example, the surface of the test strip cassette 102 can include a two-dimensional bar code (e.g., QR code). The strip recognition application recognizes the bar code from the captured image of the test strip cassette 102, and decodes the bar code to decoded information. The decoded information may include data regarding the test strip, e.g., type of the test strip cassette 102, type(s) of the test strip band(s), cutoff threshold value(s) for the test strip band(s), etc.

In some embodiments, the test strip cassette 102 may have pre-defined marker printed on it. This will make it easy for the recognition application to find the location of the test bands.

In some embodiments, the cassette attachment device 100 may include a wired or wireless communication interface 165 (e.g., WiFi, LAN, Bluetooth, Zigbee, NFC, etc.). The communication interface 165 can communicate with the strip recognition application to provide information regarding the test strip cassette 102 or information regarding the cassette attachment device 100 itself. Furthermore, the strip recognition application may control the cassette attachment device 100 via the communication interface 165. For example, the strip recognition application may instruct the control chip 144 via the communication interface 165 to adjust the light intensity of the light source 116.

In some embodiments, the cassette attachment device 100 includes a power supply interface that is configured to receive power from an external power source or from the mobile device. For example, the power supply interface can be a USB port that can receive power based on the USB protocol. The USB port can be connected to an AC power plug or another electronic device to receive power. In some other embodiments, the cassette attachment device 100 includes an energy harvesting component that is configured to derive energy from external sources (e.g., kinetic energy, solar power, thermal energy, electrical magnetic wave, etc.). For example, the energy harvesting component can be a piezoelectric component configured to convert mechanical strain into electric energy. Alternatively, the energy harvesting component can be a magnetic induction device configured to generate micro-currents by magnetic vibration relative to a conductor.

The cassette attachment device 100 may itself include an internal camera component instead of the camera window 120. In that case, the control circuit 140 controls the operations of the light source 116 as well as the internal camera component. The control circuit 140 instructs the light source 116 to provide proper light illumination to the test strip cassette 102, and then instructs the internal camera component to take a picture of the reading surface of the test strip cassette 102. The cassette attachment device 100 then transmits the image data to another electric device (e.g., a mobile device or a computer) for further analysis, via the communication interface 165.

The test strip cassette 102 reflects the light generated by the light source though the camera window 120. In some embodiments, the test strip cassette 102 includes fluorescent materials or nanomaterials that absorb some of the light and emit light at a different wavelength. A camera component of the mobile device captures the light reflected or emitted from the test strip cassette 102 though the camera window 120, and takes a picture of the test strip cassette 102. Then the mobile device analyzes the captured image of the test strip cassette 102 and determines the intensity or intensities of the band(s) of the test strip cassette 102. The details of the analysis of the capture image is disclosed in a U.S. patent application Ser. No. 14/169,066, entitled "SYSTEMS AND METHODS FOR FAST TEST STRIP INTENSITY RECOGNITION", filed on Jan. 30, 2013, which is incorporated by reference herein in its entirety.

Figure 5:
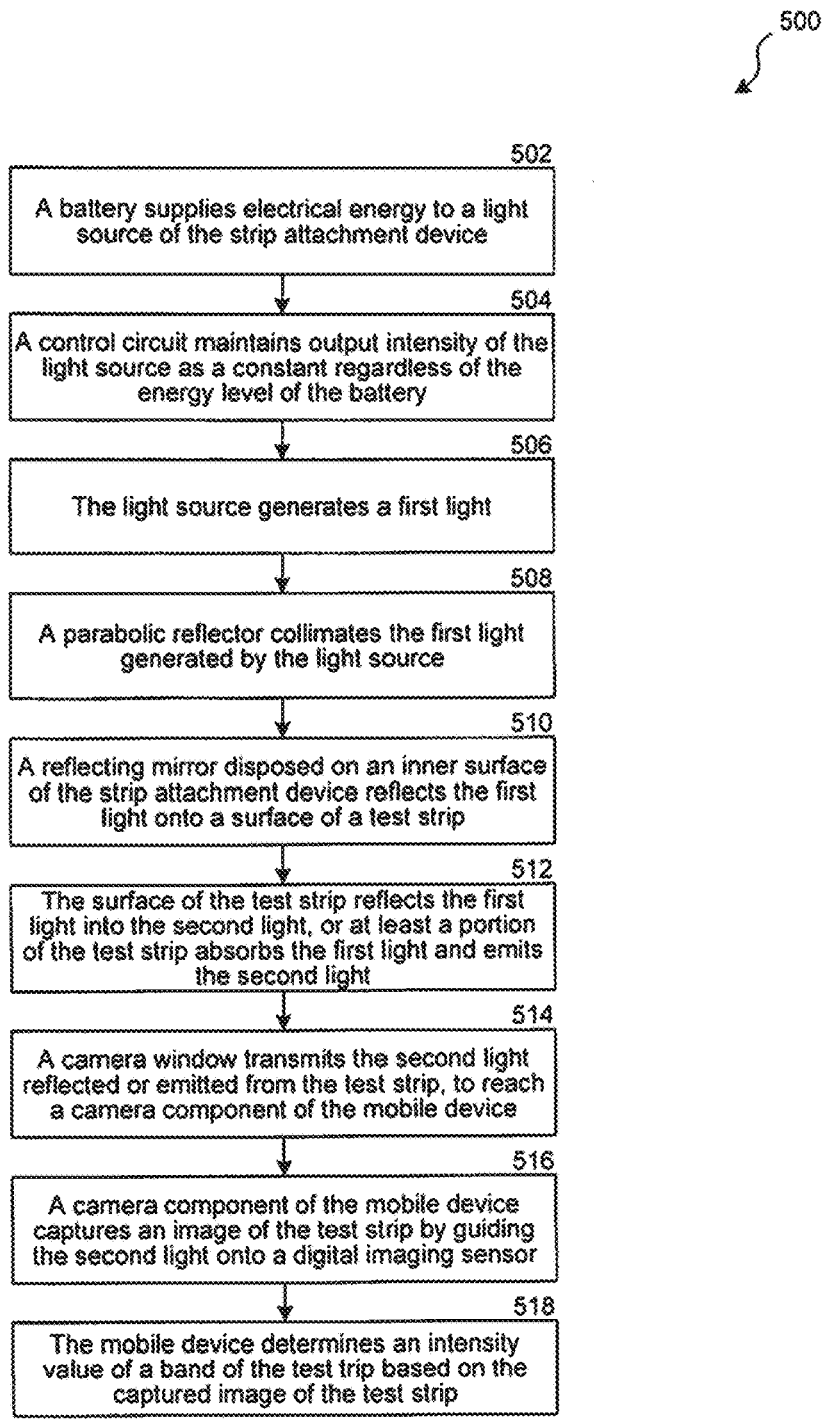
FIG. 5 illustrates a sample process of detecting intensity of a test strip.

FIG. 5 illustrates a sample process 500 for detecting intensity of a test strip, according to one embodiment of the present disclosure. At block 502, a battery of a cassette attachment device supplies electrical energy to a light source of the cassette attachment device, the cassette attachment device being attached to a mobile device. At block 504, a control circuit of the cassette attachment device maintains output intensity of the light source as a constant regardless of the energy level of the battery.

At block 506, the light source generates a first light. At block 508, a parabolic reflector of the cassette attachment device collimates the first light generated by the light source. At block 510, a reflecting mirror disposed on an inner surface of the cassette attachment device reflects the first light onto a surface of a test strip cassette to illuminate the test strip. The test strip cassette is inserted into the cassette attachment device. The light source, parabolic reflector and the reflected mirror form a light engine to ensure that a majority of the light are indirect light which are reflected before reaching the surface of the test strip.

At block 512, the surface of the test strip cassette reflects the first light into the second light, or at least a portion of the test strip cassette absorbs the first light and emits the second light. In some embodiments, the first light includes ultraviolet (UV) light, and the test strip cassette includes fluorescent materials that absorb the UV light and emit visible light. In some other embodiments, the first light includes infrared (IR) light, and the test strip cassette includes nanoscale materials that absorb the IR light and emit visible light.

At block 514, a camera window of the cassette attachment device transmits the second light reflected or emitted from the test strip, to reach a camera component of the mobile device.

At block 516, a camera component of the mobile device captures an image of the test strip cassette by guiding the second light onto a digital imaging sensor. At block 518, the mobile device determines an intensity value of a band of the test trip based on the captured image of the test strip. In some embodiments, the mobile device can further detect a barcode from the image of the test strip. The barcode may be printed on a surface of the test strip. The mobile device can decode the barcode into data about certain property of the test strip cassette (e.g., type of the test strip, cutoff threshold value, etc.).

Figure 6:
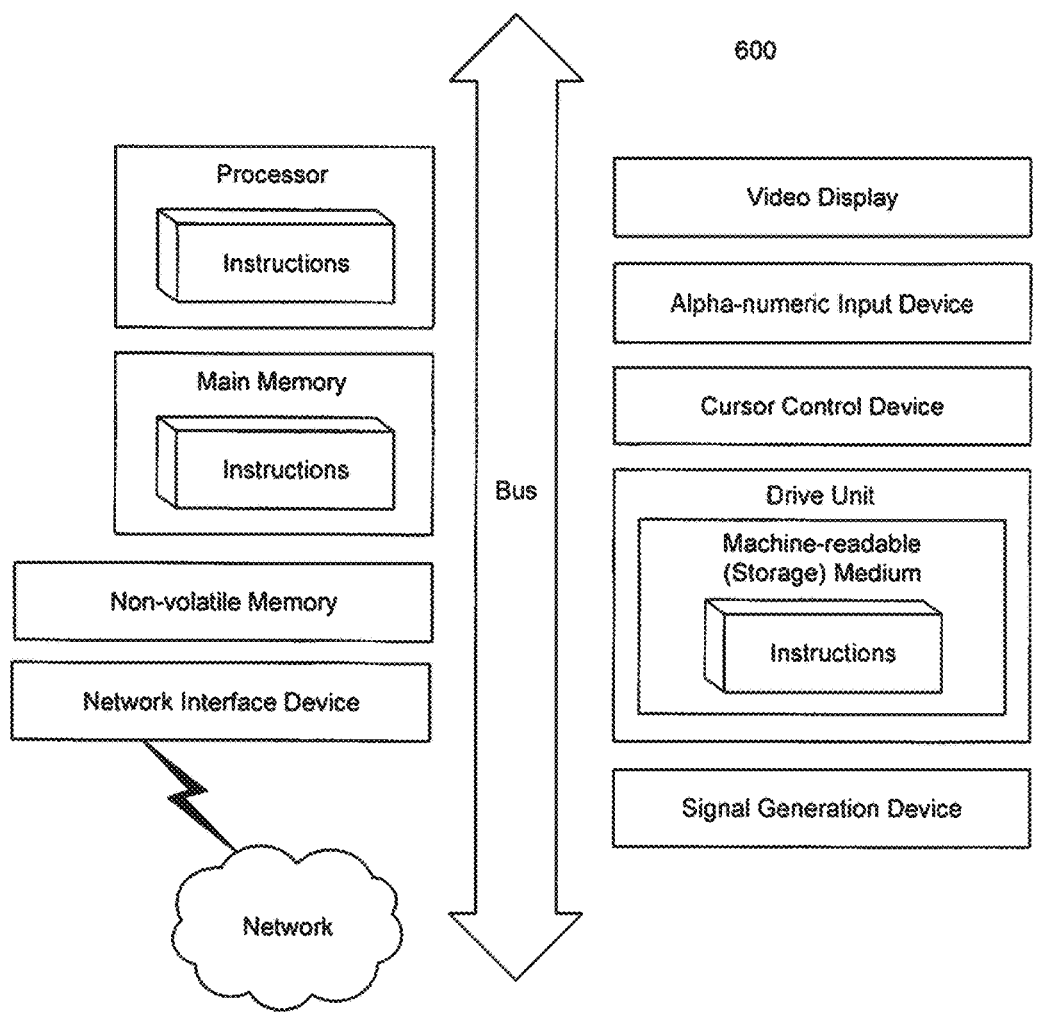
FIG. 6 shows a schematic representation of a computer device that can be part of the disclosed device or operate with the disclosed device.

FIG. 6 shows a schematic representation of a computer device that can be part of the disclosed device or operate with the disclosed device.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer devices, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

The invention claimed is:

1. A device for detecting intensity of bands on a test strip, comprising:
    a strip chamber configured to accommodate at least a portion of a test strip cassette;
    a light source configured to provide constant illumination to the test strip cassette via indirect lighting;
    a collimator, in proximity to the light source, configured to minimize light dispersion as the light emitted from the light source propagates;
    a casing component;
    at least one reflecting mirror disposed on an inner surface of the casing component;
    wherein the light source, the collimator and the at least one reflecting mirror form a light engine to provide an even uniform light, a majority of the even uniform light being emitted from the light source, reflected by the collimator or the at least one reflecting mirror, and reaching the test strip;
    an attaching mechanism configured to attach the device to a mobile device having a camera component; and a camera window configured to transmit light signal reflected from the test strip cassette through the camera window to the camera component of the mobile device such that the mobile device can capture an image of the test strip cassette illuminated by the light source.

2. The device of claim 1, further comprising:
a detachable mobile device case configured to enclose at least a portion of the mobile device;
wherein the attaching mechanism is configured to attach the device to the detachable mobile device case for detecting the intensity of the test strip.

3. The device of claim 1, further comprising:
a power source; and
a control circuit including an integrated circuit (IC) chip configured to maintain output intensity of the light source as a constant regardless of the condition or energy level of the power source.

4. The device of claim 1, wherein the collimator is a parabolic reflector.

5. The device of claim 1, wherein the camera window includes a collimating lens configured to reduce the focusing distance of the mobile device such that the mobile device can take a clear picture of the test strip cassette through the camera window.

6. The device of claim 1, wherein the light source is a surface-mounted light emitting diode (LED) chip.

7. The device of claim 1, wherein the strip chamber and the casing component of the device form a black box enclosing the portion of the test strip cassette such that light from outside of the device cannot reach a reading surface of the test strip.

8. The device of claim 1, further comprising:
a flash window configured to transmit light generated from a flash component of the mobile device to the test strip.

9. The device of claim 1, further comprising:
an internal camera component configured to capture an image of the test strip cassette; and
a communication interface configured to transfer the image of the test strip cassette outside of the device by Bluetooth or WiFi.

10. The device of claim 1, wherein the test strip cassette includes at least one pre-defined marker on a surface of the test strip cassette to help locating the bands of the test strip cassette.

11. A method for detecting intensity of a test strip, comprising:
generating a first light by a light source of a cassette attachment device, the cassette attachment device being attached to a mobile device;
collimating the first light by a collimator to minimize light dispersion as the first light generated by the light source propagates;
guiding the first light as an even uniform light to illuminate a test strip cassette inserted into the cassette attachment device, where said guiding includes
providing an even uniform light by a light engine formed by the light source, the collimator and a reflecting mirror disposed on an inner surface of a casing component, a majority of the even uniform light being emitted from the light source, reflected by the collimator or the at least one reflecting mirror, and reaching the test strip; and
transmitting a second light reflected or emitted from the test strip cassette through a camera window of the cassette attachment device, to reach a camera component of the mobile device.

12. The method of claim 11, further comprising:
capturing an image of the test strip cassette by the camera component of the mobile device using the second light; and
determining an intensity value of a band of the test trip.

13. The method of claim 11, wherein a surface of the test strip cassette reflects the first light into the second light, or at least a portion of the test strip cassette absorbs the first light and emits the second light.

14. The method of claim 11, wherein the first light includes ultraviolet (UV) light, and the test strip cassette includes fluorescent materials that absorb the UV light and emit visible light.

15. The method of claim 11, wherein the first light includes infrared (IR) light, and the test strip cassette includes nanoscale materials that absorb the IR light and emit visible light.

16. The method of claim 11, further comprising:
supplying electrical energy, by a battery of the cassette attachment device, to the light source; and
maintaining, by a control circuit of the cassette attachment device, output intensity of the light source as a constant regardless of the energy level of the battery.

17. The method of claim 12, further comprising:
detecting a barcode from the image of the test strip, the barcode being printed on a surface of the test strip; and
decoding the barcode into data about property of the test strip.

18. A portable device for detecting intensity of a test strip, comprising:
a mobile device; and
a cassette attachment device including:
a strip chamber configured to accommodate at least a portion of a test strip,
a light source configured to provide illumination to the test strip cassette via indirect lighting,
a collimator, in proximity to the light source, configured to minimize light dispersion as the light emitted from the light source propagates,
a casing component,
at least one reflecting mirror disposed on an inner surface of the casing component,
wherein the light source, the collimator and the at least one reflecting mirror form a light engine to provide an even uniform light, a majority of the even uniform light being emitted from the light source, reflected by the collimator or the at least one reflecting mirror, and reaching the test strip,
an attaching mechanism configured to mount the device to the mobile device, and
a camera window configured to transmit light signal reflected from the test strip cassette such that the mobile device can capture an image of the test strip cassette illuminated by the light source.

19. The portable device of claim 18, further comprising:
a detachable mobile device case configured to enclose at least a portion of the mobile device;
wherein the cassette attachment device is configured to detachably mount onto the detachable mobile device case.

20. The portable device of claim 18, wherein the cassette attachment device further includes:
a power source; and
a control circuit configured to maintain output intensity of the light source as a constant regardless of the condition or energy level of the power source.

21. The portable device of claim 18, wherein the mobile device includes:
a camera component configured to capture an image of the test strip cassette through the camera window; and
a processor configured to determine an intensity value of a band of the test trip based on the captured image of the test strip.

22. The portable device of claim 18, wherein the camera window includes a filter for improving a sign-to-noise ratio of the image of the test strip cassette.

\* \* \* \* \*